P. L. PAGE.
SIGNALING DEVICE.
APPLICATION FILED OCT. 5, 1916.
1,278,733.
Patented Sept. 10, 1918.
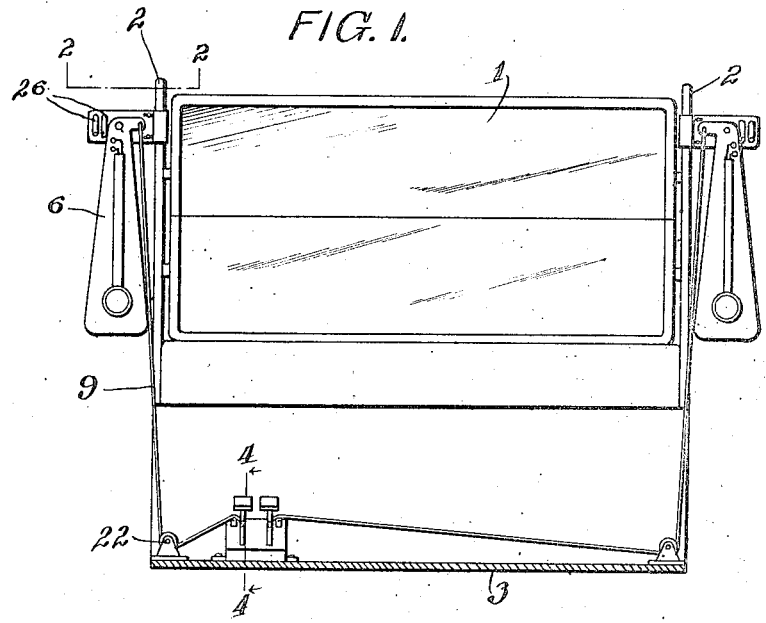
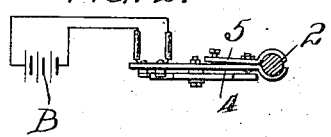
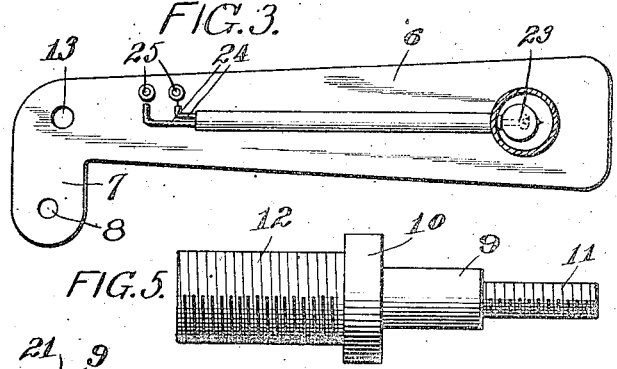
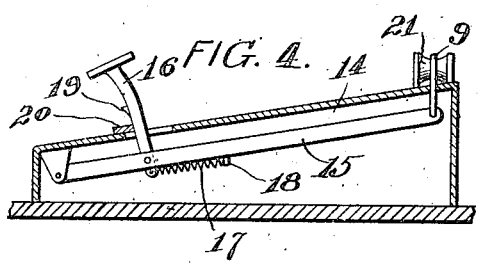
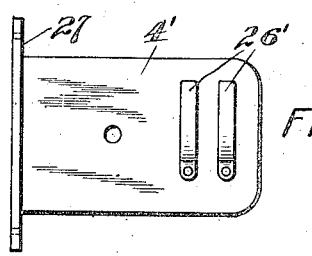
WITNESSES
INVENTOR
PLENNIE L. PAGE
BY
ATTORNEY

UNITED STATES PATENT OFFICE.

PLENNIE L. PAGE, OF LANSING, MICHIGAN.

SIGNALING DEVICE.

1,278,733.

Specification of Letters Patent.   Patented Sept. 10, 1918.

Application filed October 5, 1916.  Serial No. 123,962.

*To all whom it may concern:*

Be it known that I, PLENNIE L. PAGE, a citizen of the United States, residing at Lansing, in the county of Ingham and State of Michigan, have invented certain new and useful Improvements in Signaling Devices, of which the following is a specification.

This invention relates to signaling devices and more particularly to a signal attachment for vehicles adapted to indicate the direction in which the machine is about to turn whereby following vehicles may be properly warned in the same manner as is now done by the out-stretched arm of the automobile driver.

The principal object of the invention is to provide a pair of semaphores, one of which is mounted at each side of the wind shield and normally suspended therefrom in inoperative position but so connected to the operating levers whereby the signal or semaphore may be swung to a horizontal position at either side of the wind shield.

The invention also aims to provide a signaling device of this character having a pair of semaphores each of which carries a signal light suitably connected to a source of current and adapted when the operating levers are engaged by the foot of the operator, to automatically close the electric circuit for illuminating the lights.

As a further object of the invention the device includes a casing arranged at the footboard of the vehicle and within convenient reach of the feet of the operator whereby the semaphore carried by the wind shield may be swung to operative or inoperative position.

A further object of this invention is the provision of a signaling device which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a front elevation showing the invention applied to the sides of the wind shield.

Fig. 2 is a section on the line 2—2 of Fig. 1.

Fig. 3 is an enlarged detail elevation of one of the semaphores.

Fig. 4 is a fragmentary vertical section on the line 4—4 of Fig. 1.

Fig. 5 is a detail elevation of the pivot element for the semaphore.

Fig. 6 is a side elevation of a modified form of the bracket.

Referring to the drawing, wherein is illustrated the preferred form of my invention, and in which like numerals of reference indicate corresponding parts throughout the several views, the numeral 1 indicates the wind shield of a motor vehicle supported by the two side posts 2 in the usual manner which extend upwardly from the sides of the foot-board 3. Since the signals at both sides of the wind shield are identical in construction it has been thought advisable to disclose only one of the signals but it will be understood, of course, that the signals may be mounted upon and operated from either side of the vehicle.

A supporting bracket is mounted upon the rod 2 and comprises a supporting plate 4 having one end provided with a semi-circular groove adapted to fit the post 2. A retaining plate 5 is also provided with a similar groove for embracing the opposite side of the post 2 as clearly shown by Fig. 2 of the drawing. The plates 4 and 5 are fastened together by suitable bolts and the plate 4 is considerably longer than the plate 5. A semaphore 6 is pivotally mounted upon the plate 4 and, as shown by Fig. 3 of the drawing, is tapered and has its small end provided with an operating arm 7 the extremity of which is provided with an opening 8 for receiving one end of a flexible cable 9. The pivot element for the semaphore is shown in detail in Fig. 5 and comprises the shank 9 having a large collar 10 integrally formed thereon. A screw threaded portion 11 extends from the end of the shank 9 and receives a fastening nut for holding the pivot element to the plate 4. The plate 4 has an opening through which the shank 9 is extended and the collar 10 bears against one side of the plate while the nut on the screw threaded portion 11 bears against the opposite side thereby holding the pivot element in fixed position. A relatively large screw threaded end 12 extends from the collar 9 and is extended through an opening 13 formed in the small end of the semaphore 6 after which a washer and nut is mounted on the end 12 for holding the semaphore in position. Thus the collar 9 holds the semaphore in spaced relation to the plate 4.

Arranged on the foot board 3 is a casing 14 shown in detail in Fig. 4 of the drawing. This casing is large enough to contain the suitable operating levers for each signal or semaphore and the operating means for each semaphore includes a lever 15 pivotally mounted at one end and connected at its opposite end to the flexible cable 9. An operating foot lever 16 is pivotally connected to the lever 15 and has one end projecting beyond the pivot pin and fastened to one end of a tension spring 17 the opposite end of which is secured to a lug 18 carried by the lever 15. The foot lever 16 extends through a slot in the top of the casing and the foot lever also carries a lug or projection 19 normally disposed outwardly of the casing but which will be disposed inwardly thereof when the foot lever is pressed downwardly. A plate 20 mounted on the top of the casing is adapted to catch over the projection 19 when the foot lever is pressed downwardly. A pulley or sheave 21 is mounted on the top of the casing at the forward end thereof for receiving the cable as it comes through an opening in the top of the casing above the point at which it is attached to the lever 15. A second pulley or sheave 22 is carried by the foot board at its outer edge and also receives the flexible cable 9 whereby the proper tug will be exerted on the semaphore when the foot lever 16 is pressed.

A electric light 23 is carried by the end of the semaphore and is connected by wires 24 to the contact points 25. Spring contact members 26 are mounted upon the plate 4 and are spaced apart at the same distance at which the contact points 25 are spaced so that the contact points 25 will register with the contact members 26 when the semaphore is swung on its pivot to a horizontal position. The contact members 26 are connected to the electric circuit in the vehicle which is generally used for lighting purposes or may be connected to the terminals of an independent circuit in which a suitable source of circuit in the form of batteries B, as shown by Fig. 2 of the drawing, are arranged.

When the operator wishes to signal to a following vehicle he will simply press upon the foot lever 16 thereby swinging the semaphore 6 to a horizontal position and, in the daylight this will be sufficient to properly signal the drivers of following vehicles. In the night time, however, the electric light must be illuminated and when the contact points 25 register with the spring contact member 26 the electric circuit will be closed for properly illuminating the light.

In Fig. 6 of the drawing I have illustrated a modified form of the bracket for supporting the semaphore which includes the plate 4' having the contact members 26' and instead of employing the semi-circular portions for embracing the wind shield post, I have provided the flange 27 which is designed to be attached to the sides of vehicles having tops such as taxicabs, busses and the like which prevent the drivers of following vehicles from observing the front portion of the vehicle in front.

From the foregoing it will be observed that a very simple and durable signaling device has been provided, the details of which embody the preferred form. I desire it to be understood however, that slight changes in the minor details of construction may be made without departing from the spirit of the invention or the scope of the claim hereunto appended.

I claim:

A supporting bracket comprising a supporting plate having one end provided with a groove, a retaining plate complemental to the said supporting plate and provided with a similar groove, a semaphore pivotally mounted on the supporting plate and having its small end provided with an operating arm carrying a flexible cable at its end, the said pivot for the operating arm comprising a shank having a large collar integrally formed therewith and provided with a fastening element to maintain the said pivoted element in engagement with the said supporting plate, the said collar being in engagement with one side of the plate for coöperation with the said fastening element to maintain the pivot in fixed position, the said collar having a relatively large extension to receive the said semaphore and maintain the latter in position in spaced relation to the said plate; in combination with a support to be received in the said grooves in the plate and foot operated means engageable with the said cable to manually actuate the latter for operating the said semaphore.

In testimony whereof I affix my signature in presence of two witnesses.

PLENNIE L. PAGE.

Witnesses:
ALBA GREGORY,
FRED C. PINCKNEY.